(12) United States Patent
O'Coin

(10) Patent No.: US 6,578,613 B1
(45) Date of Patent: Jun. 17, 2003

(54) FILLED PNEUMATIC TIRES HAVING CONTROLLED EXPANSION JOINTS AND METHODS OF MANUFACTURING SUCH

(75) Inventor: Bernard J. O'Coin, Burlington (CA)

(73) Assignee: Jalcos Holdings Inc., Oakville (CA)

( * ) Notice: Subject to any disclaimer, the term of this patent is extended or adjusted under 35 U.S.C. 154(b) by 0 days.

(21) Appl. No.: 09/688,815

(22) Filed: Oct. 17, 2000

Related U.S. Application Data

(63) Continuation-in-part of application No. 09/134,757, filed on Aug. 17, 1998, now Pat. No. 6,131,630, which is a continuation of application No. 08/506,348, filed on Jul. 24, 1995, now abandoned.

(51) Int. Cl.$^7$ .................................................. B60C 7/10
(52) U.S. Cl. ........................ 152/315; 152/302; 152/316
(58) Field of Search ................................. 152/316, 315, 152/302, 310–314, 344.1, 157, 159; 156/112, 95, 110.1, 113, 122

(56) References Cited

U.S. PATENT DOCUMENTS

| | | | |
|---|---|---|---|
| 969,888 A | * | 9/1910 | Lighthouse .................. 152/316 |
| 1,009,752 A | | 11/1911 | Huebner |
| 1,031,469 A | | 7/1912 | Roberts |
| 1,176,511 A | * | 3/1916 | Zuber ........................... 152/316 |
| 1,307,800 A | | 6/1919 | Wohlgemuth et al. |
| 1,343,233 A | | 6/1920 | Stander |
| 1,407,730 A | | 2/1922 | Burgess et al. |
| 1,511,175 A | | 10/1924 | Ribarsch |
| 3,195,601 A | | 7/1965 | Travers |
| 4,197,893 A | | 4/1980 | O'Coin |
| 4,371,023 A | | 2/1983 | Campagna |
| 4,440,208 A | * | 4/1984 | Trickel et al. ............... 152/316 |
| 4,530,386 A | | 7/1985 | Nakahira |
| 4,722,377 A | | 2/1988 | Dobson |

FOREIGN PATENT DOCUMENTS

| | | | |
|---|---|---|---|
| CA | 2010057 | | 10/1990 |
| DE | 40 14646 | | 3/1991 |
| EP | 175 534 | | 3/1986 |
| GB | 2 164 903 | | 4/1986 |
| WO | WO-9703850 | * | 2/1997 |

OTHER PUBLICATIONS

Claims, German Offenlegungsschrift 40 14 646 (one sheet).

* cited by examiner

Primary Examiner—Geoffrey L. Knable
(74) Attorney, Agent, or Firm—Shlesinger, Arkwright & Garvey LLP

(57) ABSTRACT

Tire has a casing defining a hollow interior, a fill disposed in the interior of the casing, and the fill including at least one layer having an initial diameter substantially the same as the initial diameter of the casing. The fill layer includes an expansion joint. When the casing expands the expansion joint expands and causes the first layer to substantially continuously contact the casing. The expansion joint may be configured so that the layer(s) of the fill substantially continuously contact each other and the casing, respectively, as the casing expands. The expansion joint may be engineered to produce a gap extending between first and second free ends of the layer(s). Or the gaps may be selected so that the first and second ends of the respective layers continuously remain at least partially in contact with each other before, during, and after expansion is completed; i.e., when the casing is at maximum expansion.

14 Claims, 8 Drawing Sheets

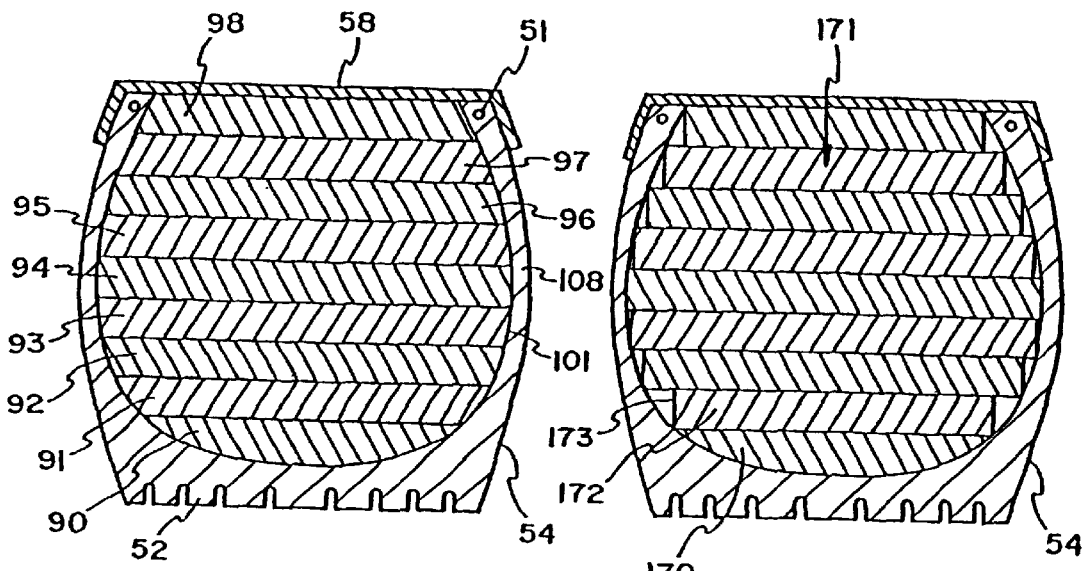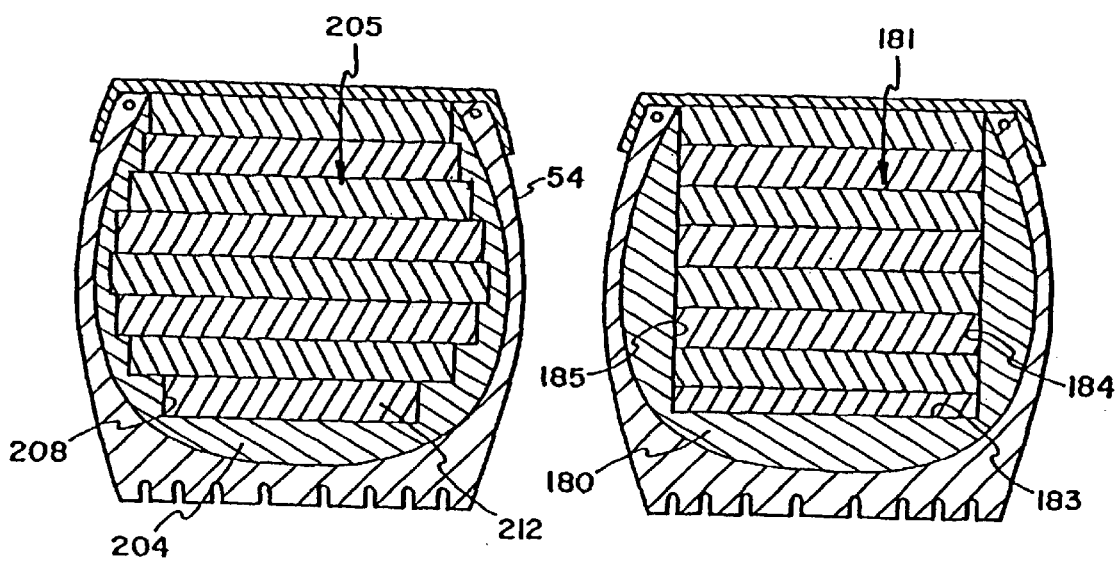

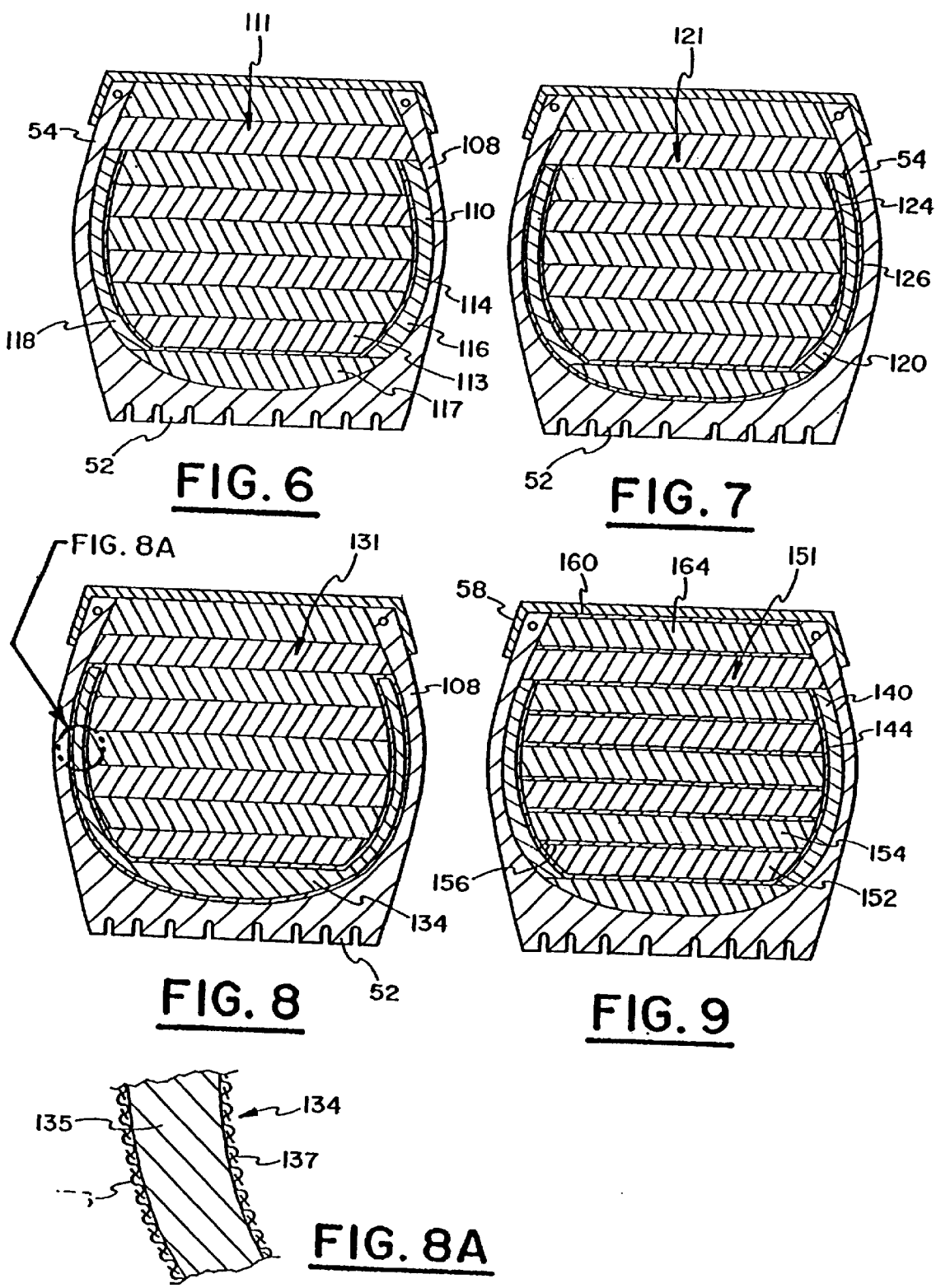

FILLED PNEUMATIC TIRES HAVING CONTROLLED EXPANSION JOINTS AND METHODS OF MANUFACTURING SUCH

CROSS-REFERENCE TO RELATED APPLICATIONS

This application is a continuation-in-part of application Ser. No. 09/134,757, filed Aug. 17, 1998, now U.S. Pat. No. 6,131,630, issued Oct. 17, 2000, which is a continuation of U.S. application Ser. No. 08/506,348, filed Jul. 24, 1995, now abandoned, which is incorporated herein by reference.

This subject application relates to U.S. patent application Ser. No. 08/418,771, filed Apr. 7, 1995, now U.S. Pat. No. 5,468,316, issued Nov. 21, 1995, which is a continuation of U.S. patent application Ser. No. 07/661,133, filed Feb. 27, 1991, which is a continuation-in-part of application Ser. No. 07/337,760, filed Apr. 13, 1989, and each of which is incorporated herein by reference.

FIELD OF THE INVENTION

The present invention relates to filled pneumatic tires and a method of producing the same.

BACKGROUND OF THE INVENTION

It is known to provide a pneumatic tire casing with a fill to create a flat-proof assembly when fitted to a wheel of a vehicle. One common method is to fill an assembled tire and wheel with a hardening material under pressure that hardens and creates the fill. Once such material is urethane liquid accompanied by a hardening agent.

Urethane filled tires have a number of disadvantages associated therewith. Known methods of filling assembled tires and wheels often require a factory site. Urethane filled tires cannot be employed on vehicles which are to be driven at high speeds, as such results in heat build-up between the rubber tire casing and the urethane fill.

Furthermore, urethane is expensive and has limited reusability when the tire casing is worn out and discarded. Machine operators dislike the rough ride of vehicles having urethane filled tires. Further, filled tires have a high rolling resistance which contributes to the rough ride and results in high fuel consumption. Urethane filled tires are also difficult to retread and, owing to the problem of casing stretching, often loosen at the rim resulting in a loss of pressure.

Where solid vulcanized polymers other than urethane are used as tire fills, similar problems are encountered, especially reversion to liquid when used at high speeds owing to the heat generated between the casing and the fill. The polymer in liquid form can leak from a loose rim or from a cut or puncture in the tire casing. Low density foamed rubber is preferable, if it could maintain its strength at high speeds.

The best known of the presently used tire fill systems is the use of high density foam rubber as illustrated in published U.K. Pat. Application No. 2,164,903A to O'Coin. As is described in this patent, independent concentric rings of high density foam rubber are manufactured and installed in pneumatic tire casings. Although this system works well, there are a number of disadvantages inherent in manufacturing and installing independent concentric rings in pneumatic tire casings. First, due to the vast number of different sizes and shapes of tires, it would be necessary for an installer to carry a huge inventory of rings. Further, the tooling required to produce the vast number of shapes and sizes of concentric rings is extremely expensive. Finally, forming the filler layers in concentric rings hinders their insertion into the pneumatic tire casing.

There are other known filled pneumatic tires, such as my previous designs schematically illustrated in FIGS. 1 and 2. My previous design tire 2 of FIG. 1 has a fill including concentric rings 10, 12 and 14 disposed on a rim 16 and inside a casing 20, shown in its rest state 21. In use, casing 20 heats up and expands to an expanded state 22, rest state 21 being shown in broken line in FIG. 2. Expanded state 22 causes a space or void 30 to develop between outermost ring 14 and casing 20 in its expanded state 22 (FIG. 2).

Additional unillustrated gaps often develop between adjacent concentric rings, and between innermost ring 10 and rim 16.

Rest state 21 of my previous design casing 20 is shown in broken line in FIG. 2. Void 30 leads to even more heat build up between outermost ring 14 and casing 16. The voids between adjacent rings, and between ring 10 and rim 16, likewise cause heat build-up and thus heat deterioration of the rings. Outermost void 30 reduces the puncture-resistance of casing 20.

Thus, there is a need in the industry for a better filled tire which enjoys the advantages of layer fills without the disadvantages thereof.

OBJECTS AND SUMMARY OF THE PRESENT INVENTION

An object of the invention is to overcome the drawbacks of the known devices.

The principal object of the present invention is to provide a polymeric fill for tires which substantially prevents the development of voids or spaces adjacent fill layers and/or between fill layers and the casing during use.

Another object of the invention is to provide a fill for tires which provides controlled expansion of the fill for ensuring that any gaps or voids which develop between abutting first and second free ends of a layer of fill when the layer of fill expands and the inner diameter of the tire casing expands, in use, do not become so large as to cause undesirable bumping, soft spots, weak spots, and the like, in use.

Another object of the invention is to provide a fill for tires which provides controlled expansion of the fill for ensuring that any configured gaps or voids which develop between abutting first and second free ends of a layer of fill when the layer of fill expands and the inner diameter of the tire casing expands, in use, do not become so large as to cause undesirable bumping, soft spots, weak spots, and the like, in use.

Yet another object of the invention is to provide for the controlled expansion of layered tire fills so that no gaps develop between abutting free ends of filled layers, which gaps are prevented from extending from an outer diameter of the fill to an inner diameter of the fill.

Yet another object of the invention is to provide controlled expansion of a layer of fill that ensures that at least a portion of the thickness of the layer of fill is always provided between the casing and the interior or inner diameter of the layer of fill.

Another object of the invention is to provide tires having a layer of fill with first and second free ends disposed adjacent each other, when installed, and so configured that, in use, at least a portion of the free ends overlap for achieving the above- and below- described objects of the invention.

A further object of the present invention is provide a means of filling many different shapes of tires with a polymeric fill which can be easily made and inserted in large or small shops or in the field with minimal skill and equipment.

Another object of the invention is to provide a puncture-resistant tire which works well at its design carcass operating stretch point.

It is another object of the present invention to provide a polymeric fill for a tire casing which gives a ride comparable to a pneumatic tire but which is puncture-resistant and flat-proof.

A further object of the present invention is to provide a method of manufacturing a variety of fill members that will fit different sizes of casings by providing the polymer fill in a linear strip form to create a layer suitable for insertion as one of a plurality of layers of the fill for a pneumatic tire.

Yet a further object of the present invention is to install the layers of fill such that the total volume of layers making up the fill is substantially equal to the internal volume of the casing.

Still yet another object of the present invention is to provide a simple and inexpensive method of providing a load-bearing filled pneumatic tire.

Still a further object of the present invention is to provide a filled tire capable of performing at higher speeds and/or greater loads than known tires.

It is yet another object of the invention to provide a filled pneumatic tire which has enhanced load-bearing and puncture-resistant qualities both at rest and under severe use conditions.

A further object of the invention is to provide a filled tire in which the layers of fill can be installed and fitted by hand.

It is another object of the invention to provide a filled pneumatic tire having an expandable fill which conforms to the inner diameter of the tire when the tire is in an expanded condition.

It is yet another object of the invention to provide a filled pneumatic tire having controlled expansion of the fill.

These objects and advantages as well as others will be readily apparent from a review of the specification, the claims and the accompanying drawings.

In summary, therefore, the invention is directed to a tire having an expandable fill which conforms to the interior of the tire in its expanded condition.

In one preferred embodiment of the invention a tire includes a casing defining a hollow interior. The casing has an initial inside diameter and an expanded inside diameter. A fill is disposed in the interior of the casing, the fill including a first layer. The first layer has an initial outside diameter substantially the same as the initial inside diameter of the casing for contacting the casing, and the first layer having an expanded outside diameter. The first layer includes first and second free ends, the first free end being disposed substantially adjacent the second free end, and the first and second free ends being substantially freely movable toward and away from each other. A first stepped portion is provided on the first free end substantially adjacent the second free end, and the stepped portion and the second free end being substantially freely movable toward and away from each other. The first stepped portion engages the second free end when the first layer assumes its initial inside diameter. The first and second free ends of the first layer being sufficiently freely movable toward and away from each other so that, when the casing assumes its expanded inside diameter, the first stepped portion of the first layer moves freely away from the second free end of the first layer and defines a first gap therebetween. The first gap being sufficiently large so that the expanded outside diameter of the first layer is sufficiently large to contact the expanded inside diameter of the casing, and the casing is substantially free of space between the first layer and the expanded inside diameter of the casing. The first stepped portion and the second end are configured and contact sufficiently so that the first gap is prevented from extending between the casing to the inside diameter of the first layer.

In another preferred embodiment of the invention, there is provided a tire having a casing defining a hollow interior, a fill disposed in the interior of the casing, and the fill including at least one layer having an initial diameter substantially the same as the initial diameter of the casing. The fill layer includes first and second free ends, the first free end being disposed substantially adjacent the second free end, and the first and second free ends being freely movable relative to each other. When the casing expands and has a final inside diameter, the first free end of the layer moves away from the second free end and defines a gap therebetween, the expansion of the diameter of the layer being sufficient so that the first layer has a final diameter sufficiently large for contacting the casing. In other words, the outer diameter of the first layer contacts the casing.

In another embodiment of the invention, there is provided a tire having a casing defining a hollow interior, a fill disposed in the interior of the casing, and the fill including at least one layer having an initial diameter substantially the same as the initial diameter of the casing. The fill layer includes an expansion joint or gap. When the casing expands the expansion joint expands and causes the first layer to substantially continuously contact the casing.

In other preferred embodiment there is a method of forming a filled tire.

Relative terms, such as up, down, left, and right are for convenience only and are not intended to be limiting.

BRIEF DESCRIPTION OF THE DRAWINGS

FIG. 5 is a cross-sectional view of the preferred embodiment of the filled pneumatic tire of FIG. 3, shown from tread to bead and with nine layers of fill;

FIG. 6 is a cross-sectional view of a further preferred embodiment of the invention, shown from tread to bead, having nine layers of fill, and an auxiliary layer adjacent the sidewalls and the tread region;

FIG. 7 is a cross-sectional view of a still further preferred embodiment of the invention, shown from tread to bead, having nine layers of fill, and a plurality of auxiliary layers adjacent the sidewalls and the tread region;

FIG. 8 is a cross-sectional view of a further preferred embodiment of the invention, shown from tread to bead, having eight layers of fill, and an auxiliary layer adjacent the sidewalls and the tread region;

FIG. 8A is a portion of FIG. 8, on an enlarged scale;

FIG. 9 is a cross-sectional view of a still further preferred embodiment of the invention, shown from tread to bead, having nine layers of fill, and an auxiliary layer adjacent the sidewalls and the tread region, as well as between the layers;

FIG. 10 is a cross-sectional view of a pneumatic tire according to another preferred embodiment of the invention, shown from tread to bead, and having fill layers of different widths;

FIG. 11 is a still further preferred embodiment of a tire according to the invention, shown from tread to bead, having a plurality of fill layers of substantially equal width, and an insert disposed between the layers and the tire casing;

FIG. 12 is a cross-sectional view of a still further embodiment of a pneumatic tire according to the invention having a plurality of fill layers having different lengths, and an insert disposed between the layers and the tire casing;

FIG. 17 illustrates the preferred embodiment of the fill layer according to FIG. 13, as installed on a cold; i.e., unexpanded or unstretched tire casing with distortions of the free ends that may arise depending on the material of the layer of fill used, the diameter of the casing, the thickness of the fill layer, and the like;

It should be noted that terms such as "pneumatic" and "tire" are used for convenience only. It is to be understood that the invention relates to all tire-like devices, whether or not filled with liquids and/or gases and whether or not pressurized.

DETAILED DESCRIPTION OF THE INVENTION

Figure 1:
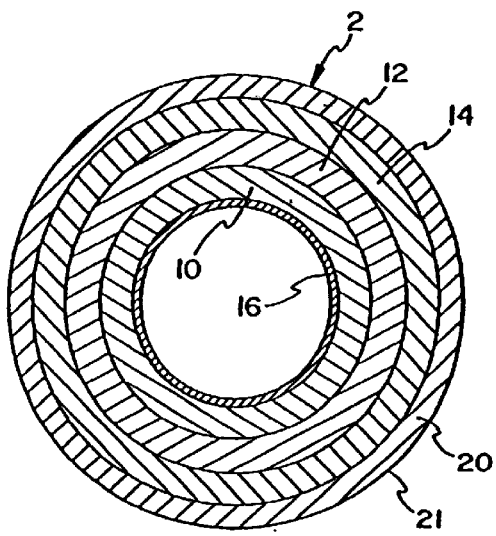
FIG. 1 is a cross-sectional view of my previous design filled tire having fills made of rings, shown at rest.
Figure 2:
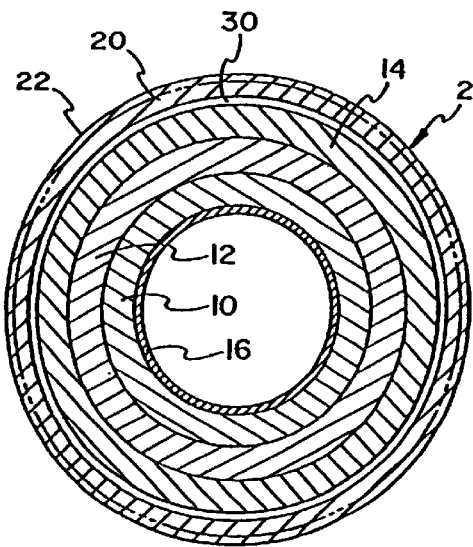
FIG. 2 is a view of my previous design tire of FIG. 1, shown in use.

FIGS. 1 and 2 illustrate my previous design tire 2 at rest (FIG. 1) and in use (FIG. 2), described in detail above under Background of the Invention.

Figure 3:
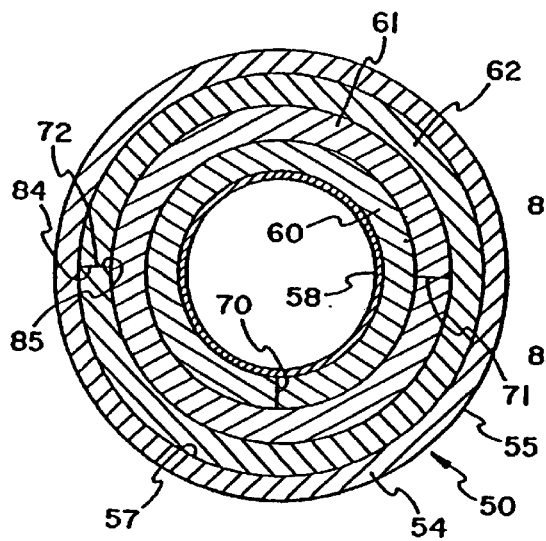
FIG. 3 is a cross-sectional view of a first preferred embodiment of a pneumatic tire according to the invention, shown at rest.
Figure 4:
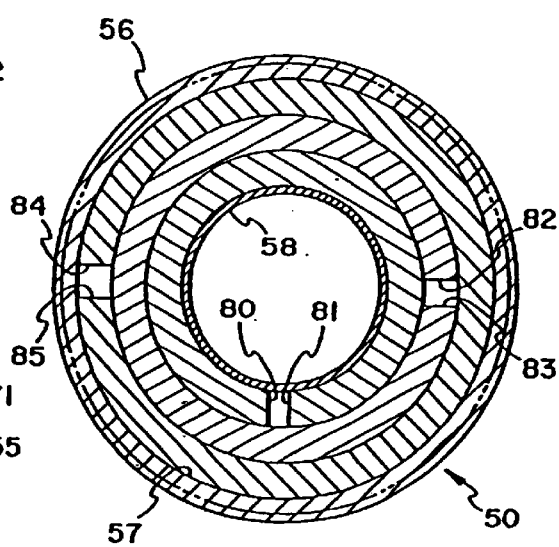
FIG. 4 is a cross-sectional view of the first preferred embodiment of FIG. 3, shown in use.

FIGS. 3–5 illustrate a preferred embodiment of a pneumatic tire 50 according to the invention.

Tire 50 includes a casing 54 having an unexpanded, resting state 55, as shown in FIG. 3, and an expanded state 56, when in use. Opposed inner walls 57 of casing 54 define an initial inside diameter when tire 50 is in its rest state, and opposed inner walls 57 define a final inner diameter when casing 54 is in its expanded state 56, as will be readily appreciated. Tire 50 has a tendency to expand in use, especially when under loaded and/or high speed conditions.

Casing 54 may be retained by a conventional rim 58.

In FIGS. 3 and 4, three layers of fill are illustrated for simplicity: an inner or third layer 60, a middle or second layer 61 and an outer or first layer 62, each of which is substantially the same in thickness. Good results have been achieved when nine layers were used, the innermost layer having a reduced thickness, as will be described below in connection with FIG. 5, and Example A. It is contemplated that each layer may have different thicknesses and/or be of different materials, and that varying number of layers may be used.

Inner layer 60 is provided with at least one expansion joint 70. Layers 61 and 62 are likewise provided with respective expansion joints 71 and 72.

Expansion joints or gaps may be constructed such as by the use of adjacent ends of the layers of fill. It is contemplated that the adjacent ends be free ends. For example, inner layer 60 may have first and second free ends 80 and 81, the middle layer 61 may have first and second free ends 82 and 83, and the outer layer 62 may have first and second free ends 84 and 85, respectively. The first and second free ends may initially abut, as shown in FIG. 3. It is likewise contemplated that a connection member extends therebetween. Such connection members may be in the form of a cord, rubber band, or of a material having elasticity the same as or differing from that of the layer of fill.

In use, when casing 54 expands from its resting state 55 to its expanded state 56, expansion joints 70, 71, and 72 provide controlled expansion of layers 60, 61 and 62, respectively. Owing to the controlled expansion of outer layer 62, for example, outer layer 62 always contacts inner wall 57 of casing 54. Thus, the puncture-resistant and flat-proof characteristics of tire 50 are maintained, even when casing 54 has assumed its expanded state 56. Hence, unlike my previous design tire 2 of FIGS. 1 and 2, no problematic gap or void 30 develops, and undesirable heat build-up and deterioration of tire 50 are avoided.

FIG. 5 is an example of tire 50 of the embodiment of FIG. 3 which has been built and successfully used with nine layers 90–98, layer 90 being the outermost layer and layer 98 being the innermost layer.

A curved or angled edge 101 of layer 93, for example, abuts the curved inner face of a sidewall 108 of casing 54. As described in greater detail in the above-referenced parent applications, and as illustrated, the curved or angled end face 101 of layer 93, for example, may be configured to mate with an abutting region of the inner face of casing 54.

In this preferred embodiment, for example, layers 90–98 may be supplied in a kit along with instructions to the user spelling out the order in which each of the layers is to be placed inside casing 54; i.e., outermost layer 90 being inserted into interior of casing 54 first, layer 91 being inserted next and placed adjacent layer 90, layer 92 being placed adjacent layer 91, and so forth.

FIG. 6 illustrates another preferred embodiment of the invention, in which an auxiliary layer or reinforcing panel 110 is disposed between sidewall 108 and fill layers 111.

Auxiliary layer 110 may extend between an outermost fill layer 113 and tread region 52. Auxiliary layer 110 may include a plurality of separate pieces 116, 117, and 118, which may be made of the same or different materials depending on the desired properties and intended use of the tire. One or more pieces of a further auxiliary layer 114 may be provided. Further auxiliary layer 114 may be likewise made of different materials depending on the intended use.

FIG. 7 illustrates a still further preferred embodiment of a tire according to the invention, in which an auxiliary layer or reinforcing panel 120 is disposed between fill layers 121 and sidewalls 108 and tread region 52.

A plurality of supplemental auxiliary layers 124 and 126 are provided. Layer 124 is an inner layer disposed between layer 120 and fill layers 121, while supplemental auxiliary layer 126 is disposed between auxiliary layer 120 and the sidewall and tread regions.

A still further preferred embodiment of a tire fill according to the invention is shown in FIGS. 8 and 8A.

A plurality of fill layers 131 is provided as in the other embodiments, and a unitary auxiliary layer 134 is disposed between fill layers 131 and sidewalls 108 and tread region 52. Auxiliary layer 134 may be a single piece of rubber, for example, or a piece of rubber clad on both sides by tire belting, such as belting nylon, belting polyester, or radial steel as used in radial tires. Such layers of belting may be laminated to the central rubber layer 135, or belting layers 136 and 137 may be positioned adjacent rubber layer 135. It is likewise contemplated that auxiliary layer 134 be made in its entirety of belting material.

FIG. 9 illustrates a yet still further preferred embodiment of a tire according to the invention, in which an outer layer or reinforcing panel 140 is disposed adjacent sidewalls 108. An auxiliary layer 144 is disposed between outer layer 140 and fill layers 151. Individual fill layers 152 and 154 are provided with a supplemental layer 156, made of belting, for example. A supplemental layer 160 may likewise be provided between an innermost fill layer 164 and rim 58.

Additional supplemental layers such as layers 156 and 160 may be provided between each adjacent pair of fill layers 161.

The preferred embodiment of a filled tire according to the invention as shown in FIG. 10, is similar to the preferred embodiment of FIGS. 3–5.

In this embodiment, the majority of fill layers 171 have substantially flat faces, such as flat face 173 on fill layer 172. An outermost fill layer 170 may have a curved outer face 174 mating with casing 54, as illustrated, or may be provided with flat faces in a manner similar to the other ones of fill layers 171.

FIG. 11 illustrates another preferred embodiment of a tire fill according to the invention, in which a surround 180 is disposed between fill layers 181.

Preferably, surround 180 has substantially flat faces 183, 184, and 185, whereby each one of fill layers 181 can have a substantially uniform cross-sectional area and configuration.

The further preferred embodiment of a pneumatic filled tire according to the invention shown in FIG. 12 includes a surround 204 disposed between a plurality of fills 205 and casing 54.

Surround 204 is provided with a plurality of stepped portions 208 configured to receive ones of fill layers 205, such as an outermost fill layer 212.

FIGS. 13–18 illustrate another preferred embodiment of a fill layer 300 according to the invention.

Fill layer 300 includes a lower face 310 and an upper face 320 which, respectively, will serve as the inner diameter and outer diameter of fill layer 300, in use.

The embodiments of the fill layers of FIGS. 3–12 have been found to work well in theory, as well as practice.

It has been found that for certain applications, the embodiments of FIGS. 13–23 may work even better.

In order to achieve production and servicing efficiencies, one may want to produce thicker layers, such as by reducing the number of layers for the tire fill required for filling a specific tire casing.

Table B below (FIGS. 3–12) illustrates a proven example where nine(9) pieces of 1 inch thick fill layers were used that resulted in a smooth, satisfactory ride.

However, when four(4) layers of 2¼ inch thick fill layers were used (i.e., instead of the nine(9) layers of 1 inch thickness) and the tire was put under heavy load, some gap length under certain conditions were found to increase to such an extent that a different configuration for the free end was sought in order to achieve the objects according the invention (FIGS. 13–23).

Through research and development, it has been found that the configurations of the free ends, for example, of the typically thicker embodiments of FIGS. 13–23 are particularly well suited for thicker fill layers.

The configuration of the continually contacting, if not continually abutting, free ends of the fill layers, in use, ensure that no undesirable gaps result under any condition, and accommodate a great variety of thicknesses of filled layers.

It should be noted that the configurations of the contacting and/or abutting free ends of the embodiments of FIGS. 13–23 ensure that, even in the case where gaps develop, the gaps are split into two, smaller offset gaps, for example.

Still further, any gap(s) that develops are controlled so that there is always at least a portion of the tire layer between the casing and the interior of the tire or between the casing and an unillustrated second fill layer located inside of the first fill layer contacting the casing.

As shown in the embodiments of FIGS. 13–23, given the single, stepped configuration of the abutting and/or contacting free ends, in use, any gap which does develop, will have a thickness (i.e., height as measured radially outward from the center of the tire) that is no more than half the thickness of the fill layer. In addition, thanks the stepped design of FIGS. 13–23, any gap which does develop is split into two(2) offset gaps with the gaps being offset by a portion of fill layer that extends completely from the inner diameter or face 310 to the outer diameter or face 320 of FIGS. 13–18, for example.

Figure 18:
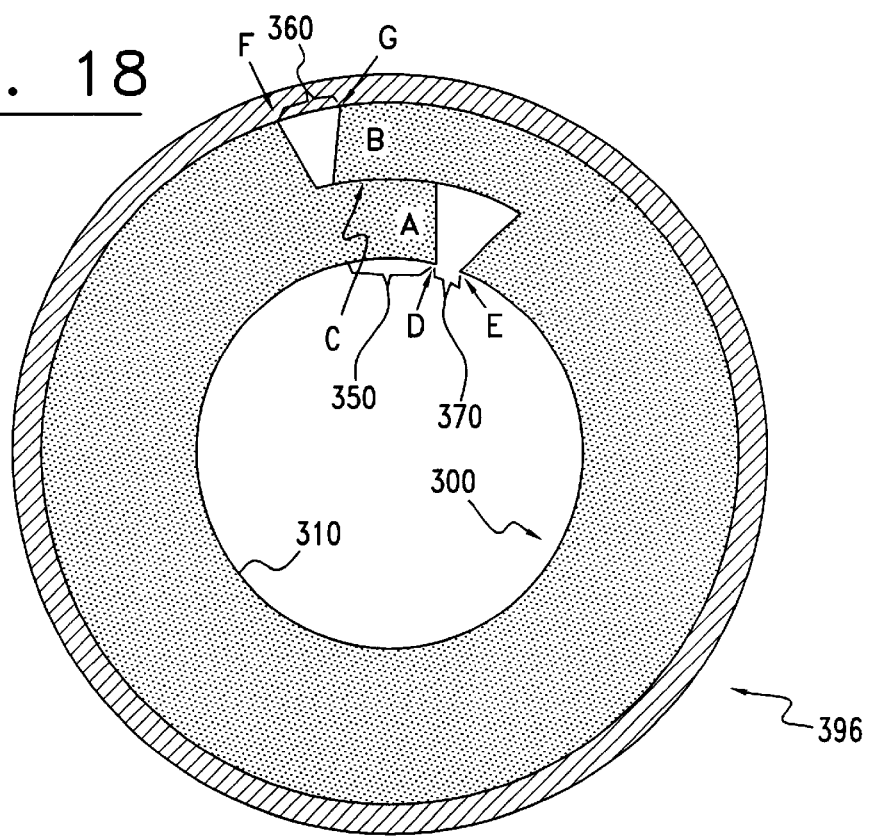
FIG. 18 illustrates what occurs to the installed fill of FIG. 17, in use, after the tire (i.e., the inner diameter of the casing) has expanded as it typically heats up during use; thus, the free ends of the layer move outwardly away from each other, yet there is no continuous gap between the casing and the interior or inner diameter of the fill layer; and there is a continuous, full thickness of fill that is provided between the two(2) offset, relatively shallow gaps that develop.
Figure 19:
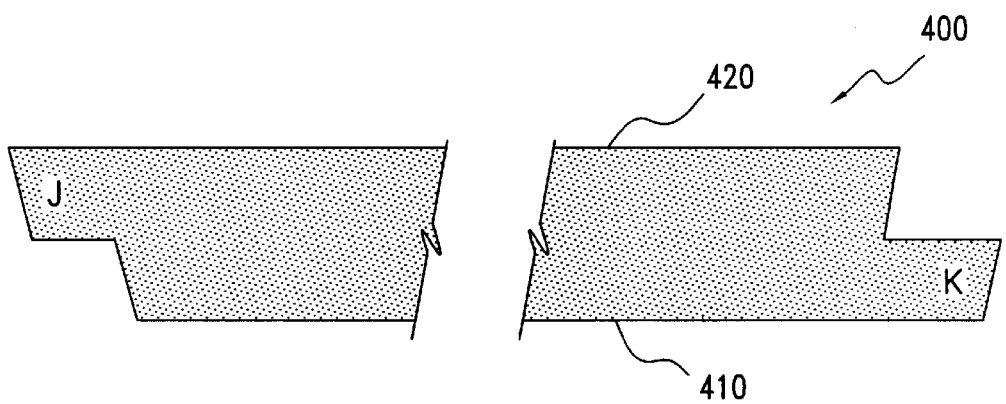
FIG. 19 illustrates yet another side elevational view of yet another preferred embodiment of a fill layer according to the invention, similar to the illustration of FIG. 13.
Figure 20:
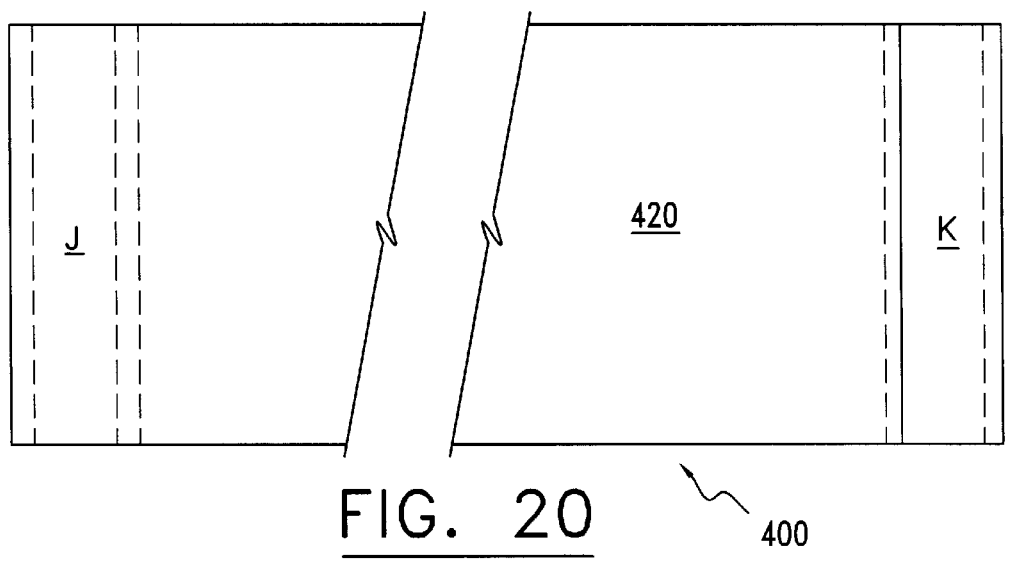
FIG. 20 is a top plan view of the preferred embodiment of FIG. 19, in an illustration similar to FIG. 14.
Figure 21:
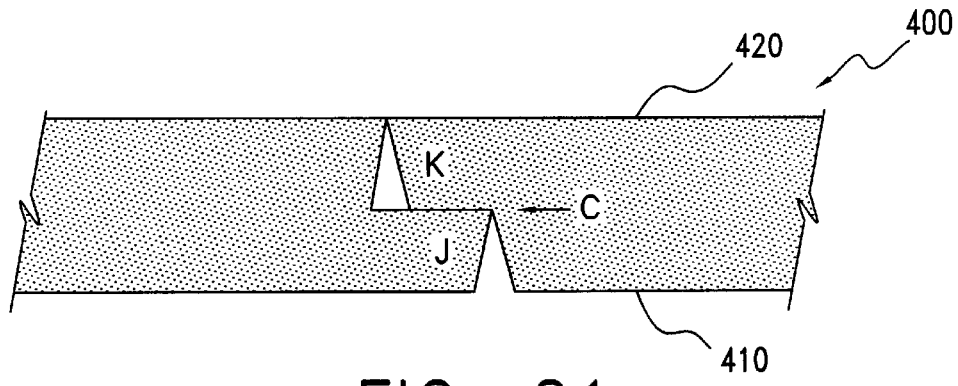
FIG. 21 is a side elevational view of an uninstalled fill layer showing somewhat theoretical abutting of the free ends of the fill layer of the embodiment of FIG. 19, to illustrate the configuration of the undistorted free ends thereof; this illustration is similar to the illustration of FIG. 15 in that regard; as the diameter of the tire increases, the abutting relationship will look more like FIG. 21 and less like FIG. 22.

That region of full thickness fill is designated as a region 350 in FIG. 18.

The offset gaps, in use, having a thickness or radial height substantially half the thickness of the tire fill are shown in regions 360 and 370 of FIG. 18, as will be readily appreciated.

Figure 17:
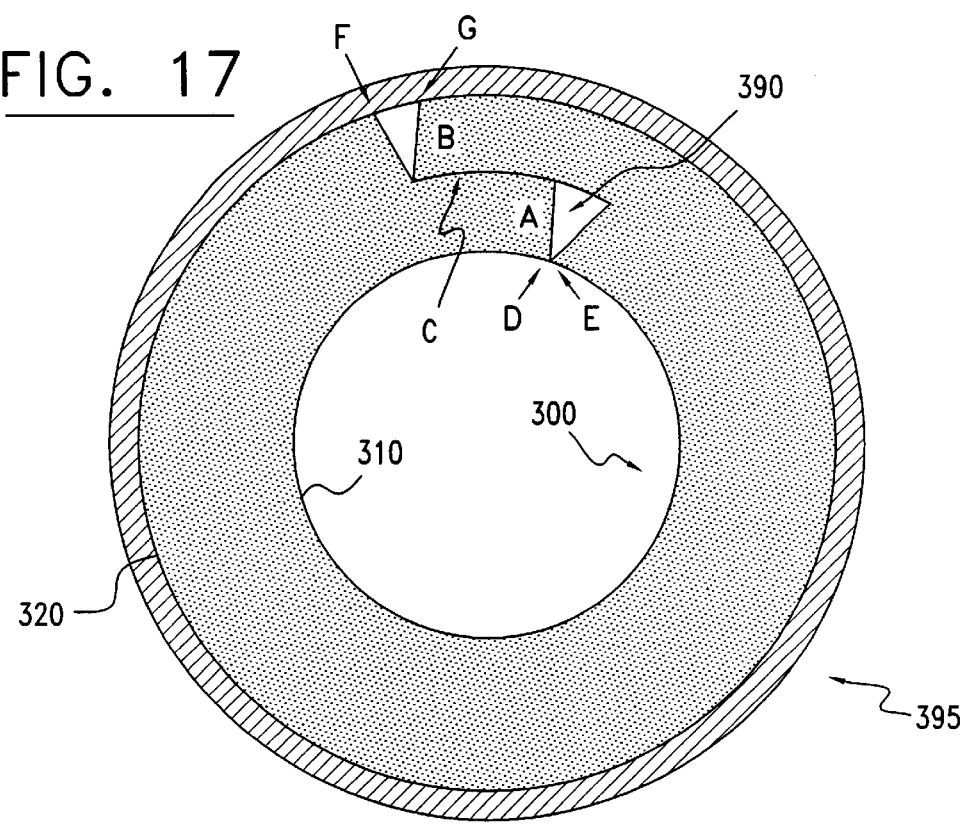

It should likewise be noted that depending on the material of the fill layer 310, some distortion of the free ends A and B may occur, on installation in the tire casing. That distortion is shown in FIGS. 17 and 18, wherein the gaps 390 between regions F and G are no longer rectangular in cross section; rather, the gaps 390 are triangular in cross sections. The same is true of the gaps 390 between regions D and E of the abutting free ends.

Figure 13:
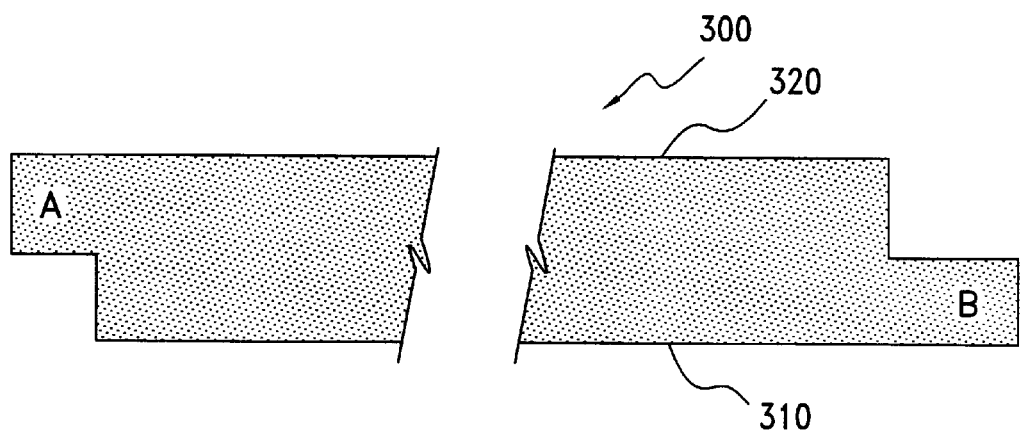
FIG. 13 is a side elevational view of yet another preferred embodiment of a fill layer according to the invention, shown flat, as typically molded.
Figure 14:
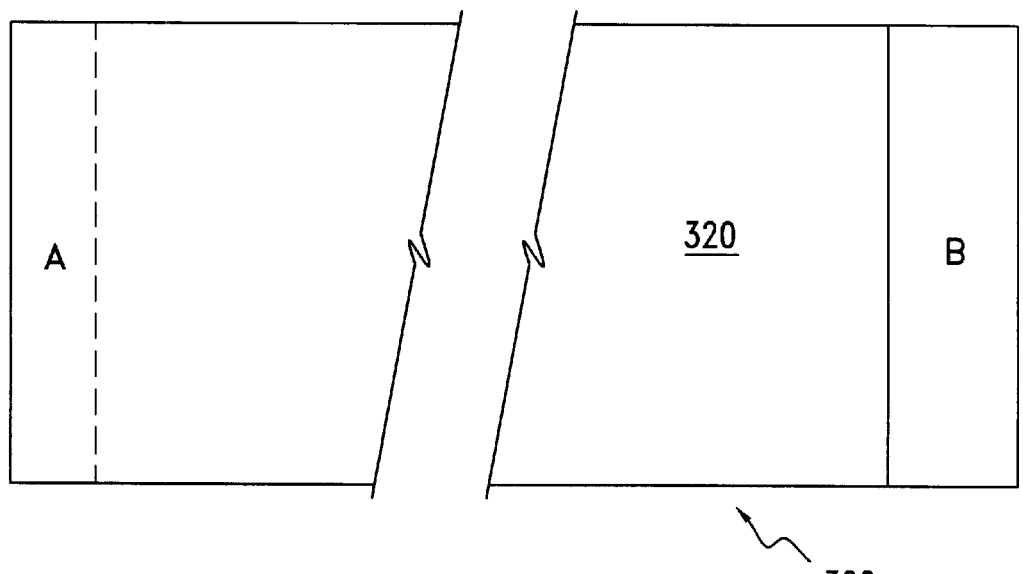
FIG. 14 is a top plan view of the flat molded layer of the embodiment of FIG. 13.
Figure 15:
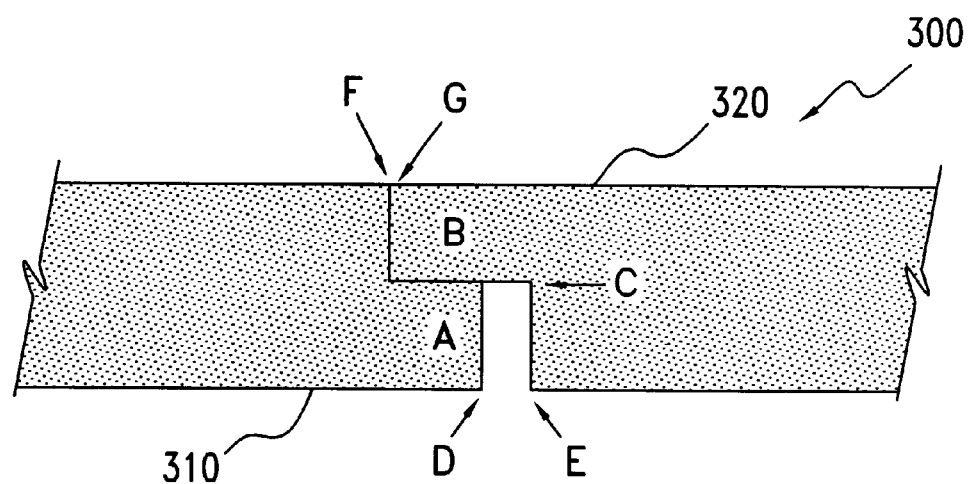
FIG. 15 is a side elevational view of the layer of FIG. 13, showing the abutment of first and second free ends of the layer, yet without the distortion of the free ends that would occur on insertion inside the tire casing, to emphasize the differences in lengths between respective contacting stepped portions of the first and second free ends.
Figure 16:
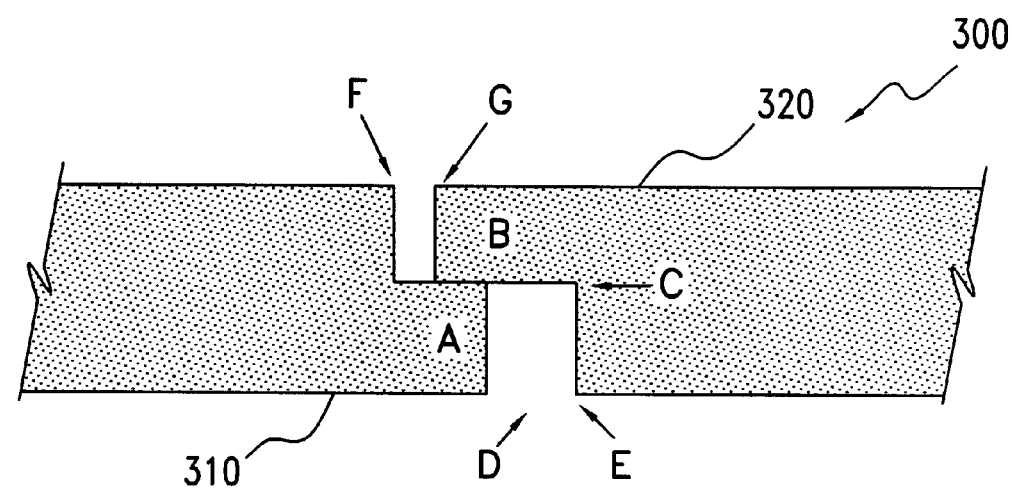
FIG. 16 is similar to FIG. 15, still showing an uninstalled position without distortion of adjacent abutting free ends of the layer of fill, showing a somewhat theoretical undistorted expansion of the fill layer and, hence, movement of respective free ends away from each other, to illustrate the development of various gaps between different portions of the free ends, while ensuring that there is always contact between portions of the free ends so that effectively there is a continuous layer of material extending from an inner (i.e., lower as illustrated) face or inner diameter of the fill to an outer face or outer diameter of the fill layer.

Quite simply, for ease of manufacturing, the fill layer 300 was constructed with squared off, stepped free ends A and B, as shown in FIGS. 13 and 14 (and FIGS. 15 and 16) which have been distorted in installation (FIGS. 17 and 18).

The distortion occurs because of the stretching of material on the outer diameter 320. The distortion of inner face or inner diameter 310 of fill 300 similarly occurs because the material of the fill layer, under pressure, has the ability to reshape itself to a degree consistent with the type of material used.

In some cases, the center line C will be, in effect, a neutral axis of the installed fill layer 300. That is, the length of center line C will neither be lengthened nor shortened when the fill layer 300 is pressed into the tire casing and assumes its substantially circular shape, as illustrated.

As will be appreciated, even if the neutral axis is not at the center line C half way between the outer diameter 320 and inner diameter 310, there will be a given neutral axis at some point, depending on the type of material used for fill layer 300.

Thus, given the center line or the neutral axis of fill layer 300, one may readily calculate the respective added, or subtracted, lengths, which are required to eliminate the gap in whole, or in part, as desired.

FIGS. 19–23 illustrate another preferred embodiment of a fill 400 according to the invention.

Fill 400 is formed with angled stepped portions J and K, unlike the squared off stepped portions A and B of fill 300 of FIG. 13.

Figure 22:
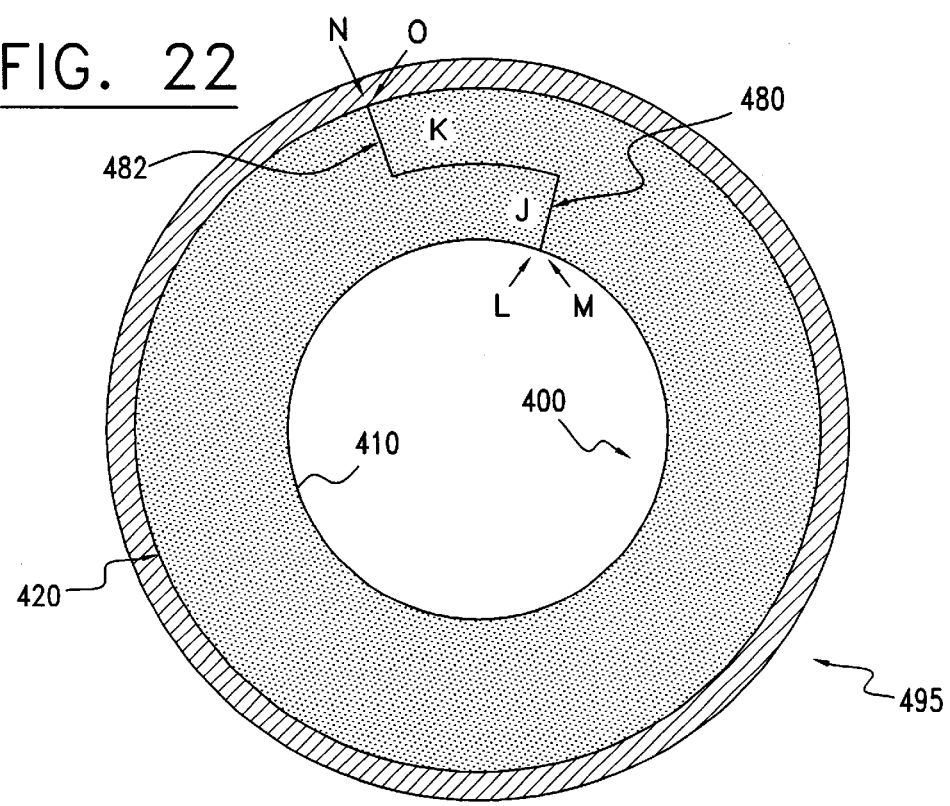
FIG. 22 illustrates the fill layer of FIG. 19 installed in a tire casing prior to use and prior to expansion of the inner diameter of the casing.

In that manner, on installation, as shown in FIG. 22, gaps or spaces are eliminated at respective inner faces or abutting faces designated at 480 and 482 where stepped portions J and K abut as the free ends of fill 400 abut and are pressed together; and, indeed, portions J and K may distort to a greater degree, depending on the material selected for fill 400, the radius of the tire, the thickness of the fill layer, and the like.

Figure 23:
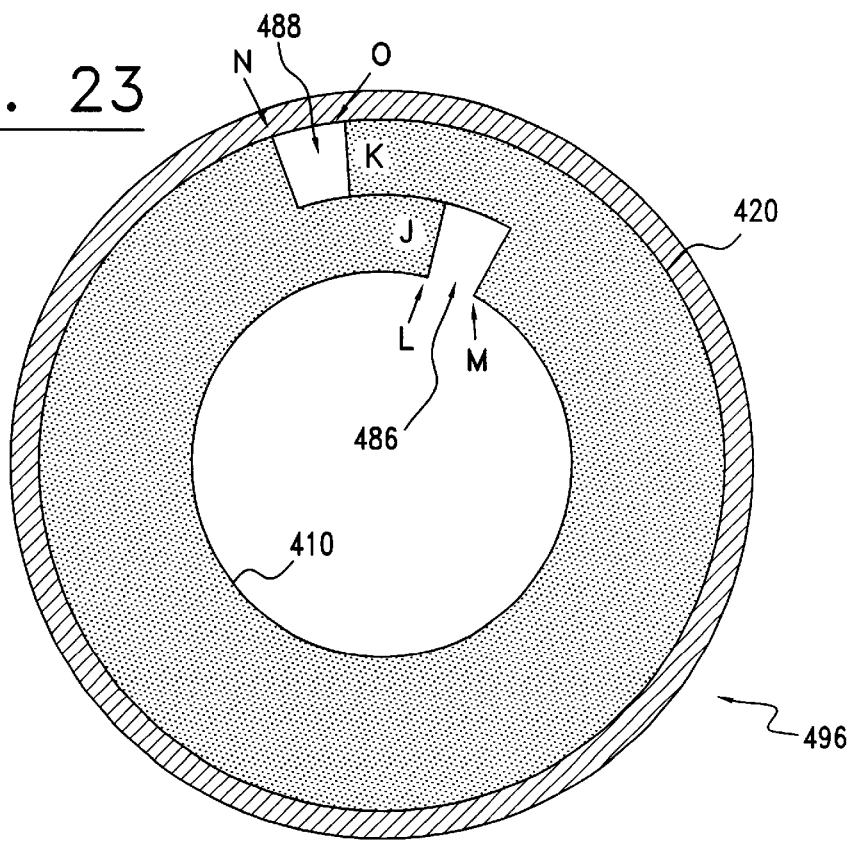
FIG. 23 illustrates the expansion of the embodiment of FIG. 19 from its installed unexpanded position or state of FIG. 22 to its expanded position with controlled gaps arising at predetermined portions thereof, so as to ensure that there are no gaps which extend completely from the outside of the fill layer to the inside of the fill layer; in other words, so that at least a portion of the fill layer always has its desired thickness, such as the full fill layer thickness at the region where free ends J and K contact.

In use, as casing 496 expands as shown in FIG. 23, a gap 486 develops between regions L and M and a gap 488 develops between faces N and O.

It will be appreciated that these are merely examples of possible configurations of free ends of the fill layers.

It is contemplated that any of a variety of configurations can be used including any number of stepped portions, any variation of abutting and non-abutting faces, in use, of first and second end portions, and the like.

Only one fill layer has been shown, in use, in each of FIGS. 17, 18, 22, and 23, for example. However, as many as four(4) or more fill layers are contemplated, as described above.

As in the embodiments of FIGS. 3–12, it is likewise contemplated that, in the case where two or more fill layers are used, the location of the abutting first and second free ends of a first fill layer will typically be circumferentially offset from the abutting free ends of adjacent, second, third, and fourth fill layers, in turn.

The description of material used for the fill layers of FIGS. 3–12 applies equally to the fill layers of FIGS. 13–23.

The squared off free ends of the embodiment of FIGS. 13–18 may be suited for fill layers made of rubber of less than ninety(90) durometer, so that the fill layer flexes and squares up, causing it to hold in a circular shape, in use, unlike materials that are more solid or rigid with less give, as the remainder of the filled layer distant from the abutting free ends is being pressed into a circle against a firm circular casing (or against an adjacent or already installed layer).

It is contemplated that in certain smaller size ranges, depending on the diameter, thickness, and step overlap, and the amount of holding force required, it may be more suitable to have angled free ends, such as in the embodiment of FIGS. 19–23, so that the triangular shaped gap 390 of FIG. 17 is eliminated, as has been accomplished in the embodiment of FIG. 22, when the fill layer is pressed into its circular shape, in use. In that manner, the free ends, in use, end up having a more squared off shape, as can be appreciated from considering FIG. 22.

In the above embodiments of the filled pneumatic tire according to the invention, the fill layers can be made from appropriate material, such as foamed rubber. The auxiliary layers or reinforcing panels disposed between the fill layers and the casing of the tire may be made of rubber, reinforced rubber, 100% tire or belting nylon, or belting polyester, or radial steel of the type used in radial tires, and the like.

The provision of such auxiliary layers and/or reinforcing panels adjacent the sidewalls of the casing assists in the reduction of splitting and failure of the casing.

Such auxiliary layers likewise assist in containing the fill layers in the event that the tire casing is split or punctured.

Still further, it has been found that such auxiliary layers aid in maintaining the required tire pressure. By maintaining the proper tire pressure, the service life of the tire and fill is lengthened.

The auxiliary layers also extend the life of the tire owing to their reinforcing the tire casing and eliminating unreinforced cuts. That is, in use, when an object cuts an opening in the tread area or in the side walls of the tire, there is often premature tire failure, although the layered soft core is often reusable. Under load, unreinforced cuts often propagate or split and become larger. Continued use of a tire having an unreinforced cut will typically result in damage to the now unpressurized fill system.

The fitted layers and the auxiliary layers or reinforcing layers may be molded or cut to the desired configuration. In the case of auxiliary layers having a predetermined configuration mating with each of the fill layers, it is contemplated that the auxiliary layer be molded of tire rubber.

USE AND OPERATION

All the preferred embodiments are readily constructed.

The tire casing to be filled is removed from its rim, and then spread, using conventional equipment.

An outermost fill layer is placed into the tire casing. The insertion may be performed manually. The user then conforms the outermost fill to the inner diameter of the tire casing.

A second fill layer is then placed against the first layer. The user may offset the expansion joint or substantially abutting free ends of the second fill layer from the expansion joint/abutting free ends of the first fill layer. The remaining layers are installed in a similar fashion.

In the case of the preferred embodiments of the invention having auxiliary layers or reinforcing panels between the layers of fill and the sidewalls, the user will install the reinforcing panels/auxiliary layers first, as required.

The filled tire casing is then mounted on the rim using the conventional equipment, and pressurized with fluid, as desired.

Good results were achieved with a filled tire according to the embodiments of FIGS. 3–12 having a given inner diameter (ID) and outer diameter (OD) and constructed as follows.

Table A compares my previous design rings (FIGS. 1–2) (cold) with the inventive layers (FIGS. 3–12) (cold).

TABLE "A"

(COMPARISON CHART)
FIGS. 1–2 versus FIGS. 3–12
Tire Size-1000 × 20
Unspread Tire ID: 38.25"
Spread Tire ID: 38"

| LAYER NUMBER | | PREVIOUS DESIGN: RINGS (OUTER DIAMETER/(OD) OF COMPLETE RINGS EACH 1" THICK) | NEW DESIGN: LAYERS (OUTER DIAMETER (OD) OF FILL LAYER, UNSPREAD, COLD EACH LAYER 1" THICK) |
|---|---|---|---|
| (1) | 1st (i.e., OD Layer): | 38.25" | 38.00" |
| (2) | 2nd Layer: | 36.25" | 35.91" |
| (3) | 3rd Layer: | 34.25" | 33.82" |
| (4) | 4th Layer: | 32.25" | 31.72" |
| (5) | 5th Layer: | 30.25" | 29.62" |
| (6) | 6th Layer: | 28.25" | 27.51" |
| (7) | 7th Layer: | 26.25" | 25.39" |
| (8) | 8th Layer: | 24.25" | 23.27" |
| (9) | 9th Layer: | 22.25" | 21.12" |

"Unspread Tire ID" means: a new tire not mounted on a wheel. "Unspread" means unspread via means of a tire spreader at the bead area of a tire.

"Spread" tire means: a tire mounted on a spreader and spread to open up the bead area of the tire.

It will be noted that when a tire is spread via the bead or sides this results in the OD (outside diameter) or tread area of a tire becoming smaller in diameter. The amount of reduction will vary as to type and construction of tire.

The word stretched or unstretched in tire terminology is generally in reference to:

a. Unstretched—the total cubic inches of the inside area of a tire mounted on a rim but not pressurized.

b. Stretched—the total cubic inches of the inside area of a tire mounted on a rim and pressurized. The pressure will always cause the new tire fabric and rubber to stretch usually in the ranges of 3–15%, relative to the heaviness of carcass materials and pressure (air, water, and the like).

Post Inflation—"Operating Stretch"

When a mounted pressurized tire is put into actual service it will for a period of time continue to stretch due to load and/or heat, and the like, to reach what is called design carcass operating stretch point. This normally can be in the range of 2–7% beyond the initial inflation stretch. This is an important reason for the provision of the expansion gap in butt end layers. The greater the design load capacity of a tire is overloaded, the more it will stretch, thus fill material must expand to support the load or to maintain the required p.s.i.

"Previous Design: Rings"

The above Table A shows that zero tolerance was allowed between each circular layer of my previous design. In other words each layer was circumferentially tight to each other within zero range which required a great deal of force to put in place. Objective being to hold the outside diameter of the tire rigid by having a zero tolerance between layers, increasing the layer widths thereby forcing the sidewalls to spread and thus holding the tire's OD at 38.25". This calls for utilizing denser or more rigid materials.

"New Design: Layers"

Table B (FIGS. 3–12) below shows that a small relative space is allowed circumferentially between each layer. It has been discovered that the relative size of this space is in relationship to:

a) the diameter of the circular layer;

b) the thickness of the layer;

c) the rigidity of the material and/or density of the layer.

Thus, ease of hand pressure when forming the expansion joint (by opposed free ends) and pushing the layer into a circular shape in the tire is a consideration. It is understood that the discovery and criteria of an expansion joint or gap will allow this ease of installation advantage.

For example, when the Operating Stretch ID of the 1000×20 tire working example was determined to be approximately 38.75" or 0.75" greater in diameter than the spread ID of 38", the result is as shown in Table B below.

Table B illustrates a working example of my invention, and sets forth data from when the layers are first installed and the tire is not yet in use (i.e., the tire is "cold"), and from when the filled tire has been used (i.e., when the tire is "operating").

TABLE B

FIGS. 3–12
Tire Size - 1000 × 20
Unspread Tire ID: 38.25"
Spread Tire ID: 38"

| EXPANSION NO. | Column 1 NEW DESIGN: LAYERS (OUTER DIAMETER (OD) OF FILL LAYER, UNSPREAD, (i.e., LAYER EACH 1" THICK) | Column 2 EASE OF FITMENT SPACE BETWEEN LAYERS (e.g., COLD LAYER SPREAD ID) | Column 3 UNSPREAD TIRE GAP (i.e., EXPANSION JOINT COLD: UNSPREAD ID MINUS OF COLUMN 2 | Column 4 OPERATING STRETCH ON DIAMETER OF LAYER (e.g. GIVEN "LINEAR" CONVERSION UNDER USE) | Column 5 OPERATING GAP OF TIRE 38.75" ID OF CASING JOINT HOT) |
|---|---|---|---|---|---|
| (1) Lin. | 38.00" | .25" Dia. | .785" Lin. | .5" Dia. | 2.357" |
| (2) Lin. | 35.91" | .09" Dia. | .2827" Lin. | .75" Dia. | 2.640" |
| (3) Lin. | 33.82" | .0957" Dia. | .3007" Lin. | .75" Dia. | 2.658" |
| (4) Lin. | 31.72" | .1022" Dia. | .3212" Lin. | .75" Dia. | 2.678" |
| (5) Lin. | 29.62" | .1097" Dia. | .3448" Lin. | .75" Dia. | 2.702" |
| (6) Lin. | 27.51" | .1185" Dia. | .3722" Lin. | .75" Dia. | 2.729" |
| (7) Lin. | 25.39" | .1288" Dia. | .4045" Lin. | .75" Dia. | 2.762" |
| (8) Lin. | 23.27" | .1411" Dia. | .4432" Lin. | .75" Dia. | 2.800" |
| (9) Lin. | 21.12" | .1561" Dia. | .4903" Lin. | .75" Dia. | 2.847" |

Column 1 includes the data from the right hand column of the Table A (comparison chart) above.

Column 2 shows the spacing between adjacent layers when considering how the installed layers/the layers being installed are ring-like, incomplete circles (i.e., the expansion joints are established at the adjacent free ends; e.g. the expansion joint defined between adjacent first and second free ends 80 and 81 of inner layer 60 of the embodiment of FIGS. 3 and 4). It has been found that in the working example, results of which are shown in Table B, the layers are easier to install when an initial gap or expansion joint is provided between adjacent free ends. To establish the initial gap, one way of defining the gap is as an expansion joint (cold) measured "linearly" (i.e, between adjacent free ends of the inserted, cold layer, as set forth in Column 3, described below. Column 2 expresses the linear distance, when measuring along the diameter of the tire (i.e., along the diameter of the ring-like inserted layer. Thus, the "unit" designation "Dia." is used to reflect the distance having been taken along the diameter of the tire.

Column 3 shows the associated expansion joint of each layer (when the layer is cold), and is a measure of the distance between the two free ends of each layer. Thus, the figures in Column 3 are a "linear conversion" of the figures of Column 2.

Column 4 reflects the expansion or "stretch" of each of the layers under use. The units of column 4 are "Dia.", as the expansion is considered as a distance measured along the diameter of the tire. Layer no. 1 has an ease of fitment space of 0.25" (column 2) and only stretches (e.g. expands) 0.5" along the diameter of the tire, in use. In use, the ID of the tire casing is 38.75" (column 4); the unspread, cold OD of layer no. 1 is 38.00"; thus, layer no. 1 expand 0.75" (i.e., 38.75"−38.00"=0.75") in order to contact the interior of the casing. Given that a reduced size (e.g., length) of layer no. 1 is easier to install, an ease of fitment space of 0.25" Dia. is provided. Thus, for layer no. 1 to expand the full 0.75" in order to contact the casing in use, layer no. 1 expands only 0.5" Dia. (i.e., 0.75" Dia.−0.25" Dia.=0.5" Dia.). Layers 2–9 each has an operating stretch of 0.75", as each layer expands fully in use contacting its respective adjacent outer layer (e.g. layer no. 2 expands and contacts layer no. 1 substantially completely at the interface between the outer face of layer no. 2 and the inner face of layer no. 1).

Column 5 is derived from (Column 2+Column 4)×π to convert to a linear expansion joint gap; e.g. (0.25"+0.5")×= #2.3257". Thus, for example, column 5 reflects the distance between first free end 84 and second free end 85 of the tire of FIG. 4, shown in use.

As to gap limit or ranges, testing has shown that a satisfactory operating margin range can be used such as the "New Design" figures. In the working example, as set forth above in Table B, the "Gap" is determined by π (pi) divided by the diameter multiplied by the thickness of that layer. As can be seen, the amount of gap increases as the diameter becomes smaller, for example at 35.91" OD (i.e., layer no. 2) the gap is 0.09" or 0.25% of the OD, at the 21.12" OD (layer no. 9) the gap is 0.1561 or 0.739% of the OD.

These ranges or gaps are developed relative to the material, the tensile strength, the rigidity, the thickness and the diameter of the circular layer to be formed. In this working example a compound of natural rubber with a foamed cellular level of 18% was used (Compound "A"). The vulcanized compound had the following characteristics: Tensile strength: 1200 p.s.i. at (30 Durometer Shore A) Elongation: 400% The gap has the limit or design criteria that the layer's gap after tire stretch should not form too large a gap in order to prevent vehicle tire loading weakness or over flex areas. Research indicates good results with the following tire diameter sizes both designed to have equivalent loadings of 90 p.s.i. using Compound "A";

| TIRE SIZE | MATERIAL THICKNESS | SATISFACTORY GAP RANGE | UNSATISFACTORY GAP RANGE |
|---|---|---|---|
| 60" | 1" | 1"–4" | 6" plus |
| 30" | ¾" | ½"–2½" | 4" plus |

As to my innovation, the following discussion applies.

It was common belief that a fill material must be very tight with no gaps or major voids or depressurization and failure would occur. With solid one piece fill systems where voids existed this certainly has been the case in operating terms. Difficulties also have occurred where full circle rings have been used and the operating stretch became too much, causing a void or space between the OD circle layer and the casing ID, thereby causing depressurization of the tire casing. See void 30 arising when my prior design tire of FIG. 2 was in use, as described above. The need for an installed system to expand rather than to rigidly try to limit sidewall stretch (thus maintaining pressure) became a desirable goal. The inventive "gap" or expansion joint has solved this problem.

The load on the tire actually loads the layers forcing them to open up the gap and remain tight to one another. Test results have shown that owing to the layer's being trapped in the tire, plus the load tension, the layers maintain tight contact with each other without the gap opening and closing. By eliminating gap opening and closing, resultant material fatigue is prevented. The flexibility, elongation, and high coefficient of contact of the material in the layers to one another is important to this positive result of reduced expansion and contraction of the size of the gap.

It will be noted that in my previous design example, as the fitments were exact and the spread decreased the I.D., it was necessary to form two humps in the layer (i.e., the complete ring forming a layer) in order to hand press the ring into the tire as the resistance on one would normally be too great for manual compression.

It was found in the working example shown in Table A that layer no. 2 and layer no. 3 could be adjusted to a shorter length relative to spread I.D., necessary to get the layer into the tire. This allows for one hump in the layer that is easily pressed into the full circle. Even though this may result in a slightly greater gap at the ends, as long as each layer's gap is offset from each other the performance is not affected. Thus, for example, layer no. 1 of Example A has a 38.00" OD which is the spread diameter for ease of fitment. (It is noted that the unspread diameter of the tire is 38.25"). No allowance is made for a hump to provide "snap" from the first layer because when the first layer is being pushed into its final circular form the tire is relaxed (i.e., unspread) thereby picking up the 0.25" required for ease of "snap". When the tire is again spread for the next layer (i.e. layer no. 2) the ID of the tire casing again goes to 38.00"; thus, layer no. 1 is tight; namely, no spacing is between layer no. 1 and the casing. Thus, layer no. 2 requires 0.09" ease of fitment space between itself and layer no. 1, for example.

FIGS. 13–22 Examples

Fill 300 was made 2¼ inches thick. Four(4) fills (totaling 9 inches thick) filled the pneumatic tire. The unstretched length of first fill 300 of FIG. 13 was 93½ inches. The length of stepped portion A was 4¼ inches and stepped portion B was 5¾ inches.

The layers according to the invention may be formed by molding or cutting of the individual layers, as described in detail in my earlier applications referred to above and incorporated by reference.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A tire, comprising:

a) a casing defining a hollow interior;

b) said casing having an initial inside diameter and an expanded inside diameter;

c) a fill disposed in the interior of said casing, said fill including a first layer and a second layer;

d) said first layer having an initial outside diameter, said initial outside diameter being substantially the same as said initial inside diameter of said casing for contacting said casing, and said first layer having an expanded outside diameter;

e) said first layer including first and second free ends, said first free end being disposed substantially adjacent said second free end, and said first and second free ends being substantially freely movable toward and away from each other;

f) a first stepped portion provided on said first free end substantially adjacent said second free end, and said first stepped portion and said second free end being substantially freely movable toward and away from each other;

g) said first stepped portion engaging said second free end when said first layer assumes its initial inside diameter;

h) said first stepped portion and second free end of said first layer being sufficiently freely movable toward and away from each other so that, when said casing assumes said expanded inside diameter, said first stepped portion of said first layer moves freely away from said second free end of said first layer and defines a first gap therebetween, said first gap being sufficiently large so that said expanded outside diameter of said first layer is sufficiently large to contact said expanded inside diameter of said casing, said casing being substantially free of space between said first layer and said expanded inside diameter of said casing, and said first stepped portion and said second end being configured and contacting sufficiently so that said first gap is prevented from extending between said casing to said inside diameter of said first layers i) said second layer being disposed substantially adjacent said first layer;

j) said second layer having first and second free ends, said first free end being disposed substantially adjacent said second free end, and said first and second free ends being freely movable toward and away from each other;

k) said first and second free ends of said second layer being circumferentially spaced from said first and second free ends of said first layer; and l) said first and second free ends of said second layer being sufficiently freely movable toward and away from each other so that, when said casing assumes said expanded inside diameter, said first free end of said second layer moves freely away from said second free end of said second layer and defines a second gap therebetween.

2. A tire as defined in claim 1, wherein:
a) said first free end of said second layer includes a stepped portion.

3. A tire as defined in claim 1, wherein:
a) said second free end of said first layer includes a stepped portion.

4. A tire as defined in claim 1, wherein:
a) said second layer includes a material which differs from a material of said first layer.

5. A tire as defined in claim 1, wherein:
a) said fill includes a foamed rubber material.

6. A tire as defined in claim 1, wherein:
a) each one of said first and second layers includes only a single first and second free end.

7. A tire as defined in claim 1, wherein:
a) said second gap is sufficiently large and said second layer expands sufficiently to substantially prevent relative movement between said first layer and said second layer when said first and second layers assume respective expanded diameters.

8. A tire as defined in claim 1, wherein:
a) each one of said first and second layers includes only a single first and second free end.

9. A tire, comprising:
a) a casing defining a hollow interior;
b) said casing having an initial inside diameter and an expanded inside diameter;
c) a fill disposed in the interior of said casing, said fill including a first layer and a second layer;
d) said first layer having an initial outside diameter, said initial outside diameter extending substantially outwardly to said initial inside diameter of said casing for contacting said casing, and said first layer having an expanded inside diameter and an expanded outside diameter;
e) said first layer having first and second free ends, and said first free end being disposed substantially adjacent said second free end;
f) said second layer being disposed substantially adjacent said first layer;
g) said second layer having first and second free ends, and said first free end being disposed substantially adjacent said second free end;
h) a configured portion disposed on said first free end of said first layer, said configured portion being disposed adjacent said second free end of said first layer and substantially continuously contacting said second free end of said first layer;
i) each of said first and second free ends of said first and second layers being sufficiently freely movable toward and away from each other so that, when said casing assumes said expanded inside diameter, said configured portion of said first free end of said first layer moves freely away from said second free end of said first layer and defines a first gap therebetween, said first layer assumes its expanded outside diameter, and said first gap being sufficiently large so that said expanded outside diameter of said first layer is sufficiently large to contact said expanded inside diameter of said casing, and said first free end of said second layer moves freely away from said second free end of said second layer and freely away from said second free end of said second layer and defines a second gap therebetween, said second gap being sufficiently large so that an expanded outside diameter of said second layer is sufficiently large to contact said expanded inside diameter of first layer; and
j) when said casing assumes said expanded inside diameter, said configured portion of said first free end prevents said first gap from extending from said outside diameter of said first layer to said inside diameter of said first layer, and said casing is substantially free of spaces between said expanded outside diameter of said first layer and said expanded inside diameter of said casing, and said expanded inside diameter of said first layer and said expanded outside diameter of said second layer are substantially free of spaces therebetween.

10. A tire as defined in claim 9, wherein:
a) a third layer is disposed substantially adjacent said second layer;
b) said third layer has first and second free ends, said first free end being disposed substantially adjacent said second free end, and said first and second free ends being freely movable toward and away from each other;
c) said first and second free ends of said second layer are circumferentially spaced from said first and second free ends of said third layer;
d) said first and second free ends of said third layer being sufficiently freely movable toward and away from each other so that, when said second layer assumes its expanded diameter, said first free end of said third layer moves freely away from said second free end of said third layer and defines a third gap therebetween, said third gap being sufficiently large so that said third layer has a final diameter sufficiently large to contact said second layer, and said third layer and said second layer being substantially free of spaces therebetween.

11. A tire as defined in claim 9, wherein:
a) said second layer includes a material which differs from a material of said first layer.

12. A tire as defined in claim 9, wherein:
a) said fill includes a foam rubber material.

13. A tire as defined in claim 9, wherein:
a) each one of said first and second layers includes only a single first and second free end.

14. A tire as defined in claim 9, wherein:
a) the flexibility, elongation, and coefficient of contact of the material of the first layer is selected for reducing expansion and contraction of the size of the gap of said first layer after the gap of said first layer has been defined.

* * * * *